J. P. NIKONOW.
COIL RETAINING DEVICE AND METHOD OF ASSEMBLING THE SAME.
APPLICATION FILED DEC. 26, 1913.
1,300,859.  Patented Apr. 15, 1919.
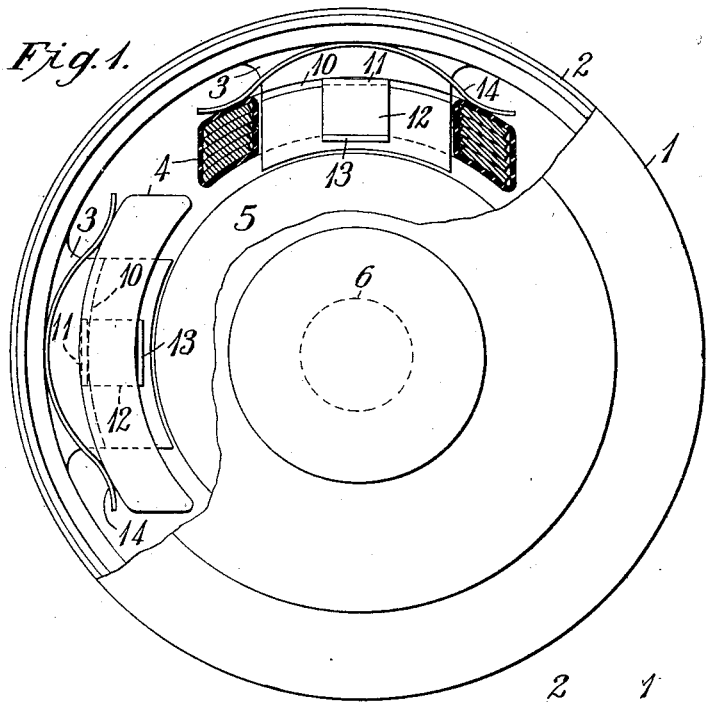
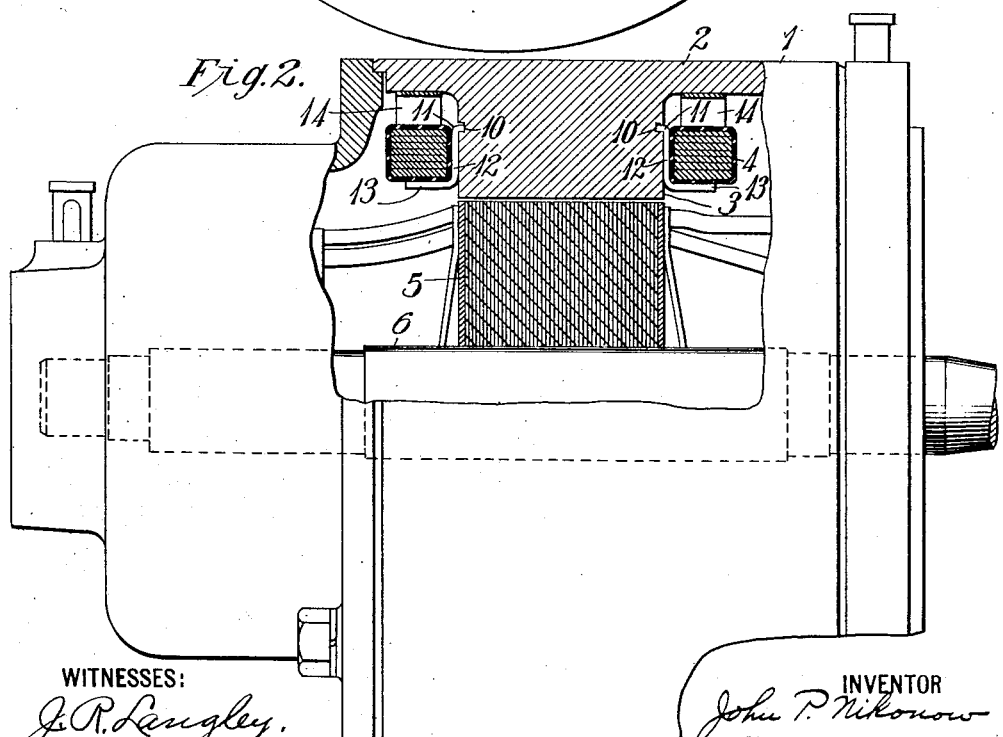
WITNESSES:
J. R. Langley.
Fred H. Miller
INVENTOR
John P. Nikonow
BY
Wesley G. Carr
ATTORNEY

UNITED STATES PATENT OFFICE.

JOHN P. NIKONOW, OF WILKINSBURG, PENNSYLVANIA, ASSIGNOR TO WESTINGHOUSE ELECTRIC AND MANUFACTURING COMPANY, A CORPORATION OF PENNSYLVANIA.

COIL-RETAINING DEVICE AND METHOD OF ASSEMBLING THE SAME.

1,300,859.　　　　Specification of Letters Patent.　　Patented Apr. 15, 1919.

Application filed December 26, 1913.　Serial No. 808,710.

*To all whom it may concern:*

Be it known that I, JOHN P. NIKONOW, a citizen of the United States, and a resident of Wilkinsburg, in the county of Allegheny and State of Pennsylvania, have invented a new and useful Improvement in Coil-Retaining Devices and Methods of Assembling the Same, of which the following is a specification.

My invention relates to dynamo-electric machines, and it has special reference to supporting structures for the field coils thereof.

One object of my invention is to provide an effective, durable, inexpensive and conveniently applied coil support that is capable of resisting the stresses imposed upon the field coils and of holding the said coils securely in position under all operating conditions.

A further object of my invention is to provide a novel method of assembling the coil support upon a polar projection.

Field coil supports, as heretofore constructed, have usually been of a cumbersome and expensive design, or have been composed of a multiplicity of parts which were liable to work loose under continued stresses, thereby allowing the coils to become displaced.

According to my present invention, I provide a supporting means for field coils that is extremely simple in construction, and embodies a minimum number of parts, that are capable of being readily assembled.

My invention is illustrated in the accompanying drawings, in which Figure 1 is an end and sectional view of a motor constructed in accordance with my invention, and Fig. 2 is a side and sectional view of the motor shown in Fig. 1.

Referring to the drawings, a motor 1 comprises a stationary field magnet frame 2, having polar projections 3 that are surrounded by field coils 4, and an armature 5. The polar projections 3 are provided with oppositely disposed rectangular recesses 10 that extend across the sides of the poles and are adapted to receive the ends of, or shoulders 11 upon, coil supports 12. The coil supports 12 are constructed of pliable material such as copper, and, before assembling, are substantially flat rectangular plates with the exception that their ends are turned up to form shoulders 11.

When assembling, the coil supports 12 are placed flat against the sides of the polar projections 3 with the shoulders 11 projecting into the recesses 10. The field coils 4 are then placed upon the polar projections 3 over the supports 12, thereby locking the shoulders 11 in position in the recesses 10. The projecting ends of the supports 12 are then bent outwardly at right angles to the main portions thereof to form supporting arms 13. The supports 12 and the coils 4 are interlocked in position by reason of their relations to the polar projections 3, thereby providing a rigid and substantial structure.

Leaf springs 14 may also be provided to assist in supporting the coils 4, if desired, but these are not essential and form no part of my present invention.

While I have shown and described the preferred embodiment of my invention and a particular adaptation thereof, I do not wish to be limited to the precise construction shown.

I claim as my invention:

1. The method of assembling a coil-support upon a polar projection which consists in first loosely interlocking said support with said projection, then placing a field-magnet coil over said projection and said support to maintain said support in locking engagement with said projection and finally in bending a portion of said support over said field coil to hold said coil in position.

2. The method of assembling a coil-support and a polar projection provided with corresponding recessed and projecting portions which consists in engaging said portions, then placing a field-magnet coil over said projection and said support and finally in bending a portion of said support over said coil.

3. The method of assembling a coil-support upon a polar projection provided with a recess which consists in inserting a portion of a flexible strip into said recess, then placing a field-magnet coil over said projection and said strip and finally in bending a portion of said strip over the edge of said coil.

4. The combination of a polar projection provided with a recess on one side, a coil-supporting strip having an offset portion interlocking with said recess, and a coil positioned on said polar projection and holding said strip in position, said strip having a bendable end adapted to engage said coil to support it in position on the polar projection.

In testimony whereof, I have hereunto subscribed my name this 19th day of Dec. 1913.

JOHN P. NIKONOW.

Witnesses:
HARRY T. GEORGE,
B. B. HINES.